(12) United States Patent
Sherlock et al.

(10) Patent No.: US 6,918,134 B1
(45) Date of Patent: Jul. 12, 2005

(54) DATA REQUEST METHOD WITHOUT USING DEDICATED CONNECTIONS

(75) Inventors: Daniel J. Sherlock, Fullerton, CA (US); Robert W. Preston, Redlands, CA (US)

(73) Assignee: Rockwell Collins, Cedar Rapids, IA (US)

( * ) Notice: Subject to any disclaimer, the term of this patent is extended or adjusted under 35 U.S.C. 154(b) by 871 days.

(21) Appl. No.: 09/670,972

(22) Filed: Sep. 27, 2000

(51) Int. Cl.$^7$ ................................................. H04N 7/18
(52) U.S. Cl. ........................ 725/76; 725/430; 348/837
(58) Field of Search ........................... 725/76, 130, 150; 348/837

(56) References Cited

U.S. PATENT DOCUMENTS

| | | | |
|---|---|---|---|
| 3,806,795 A | | 4/1974 | Morey |
| 4,398,171 A | | 8/1983 | Dahan et al. .................. 340/22 |
| 4,831,438 A | | 5/1989 | Bellman, Jr. et al. ........ 358/108 |
| 5,523,767 A | | 6/1996 | McCorkle |
| 5,644,363 A | | 7/1997 | Mead .......................... 348/563 |
| 5,729,373 A | | 3/1998 | Sakuyama ................... 359/189 |
| 5,825,283 A | * | 10/1998 | Camhi .......................... 340/438 |
| 5,835,127 A | * | 11/1998 | Booth et al. .................... 725/76 |
| 5,848,367 A | * | 12/1998 | Lotocky et al. ............... 701/36 |
| 5,952,956 A | | 9/1999 | Fullerton |
| 5,953,429 A | | 9/1999 | Wakai et al. .................. 381/77 |
| 5,973,722 A | * | 10/1999 | Wakai et al. .................. 725/76 |
| 6,189,127 B1 | * | 2/2001 | Fang et al. ................... 714/799 |
| 6,243,568 B1 | | 6/2001 | Detlef et al. .............. 455/226.4 |
| 6,249,913 B1 | | 6/2001 | Galipeau et al. ............... 725/76 |
| 6,393,053 B1 | | 5/2002 | Maier .......................... 375/224 |
| 6,529,706 B1 | * | 3/2003 | Mitchell ..................... 455/12.1 |
| 6,625,144 B1 | * | 9/2003 | El-Batal et al. .............. 370/364 |

OTHER PUBLICATIONS

PCT International Search Report of May 29, 2002 relating to cited prior art references.

Bird, T.S. et al., "Millimetre–Wave Antenna and Propagation Studies for Indoor Wireless LANs"; Digest of the Antennas and Propagation Society International Symposium; Seattle, WA, Jun 19–24, 1994, new York, IEEE U.S.; vol. 3, Jun. 20, 1994; pp. 336–339.

Eide, E.S., "Ultra–Wideband Transmit/Receive Antenna Pair for Ground Penetrating radar"; IEEE Proceedings, Microwave Antennas Propagation, Institute of Electrical Engineers, Stevenage, GB; vol. 147, No. 3, Jun. 12, 2000; pp. 231–235.

* cited by examiner

*Primary Examiner*—Krista Bui
(74) *Attorney, Agent, or Firm*—Nathan O. Jensen; Kyle Eppele

(57) ABSTRACT

In-flight entertainment systems provide entertainment for passengers on commercial airline flights. Presently, usually on longer flights, video entertainment is commonly available on in-flight passenger entertainment systems. In-flight entertainment systems can display video on a variety of display monitors ranging from a conventional CRT display to a more modern Liquid Crystal Display (LCD). Generally most displays are connected to the aircraft electronic system via a ARINC 722 connector. The ARINC 722 connector commonly provides an electrical interface between the aircraft and the video system, whether the video system is a CRT or LCD type monitor. With the increasing use of LCD monitors there is a greater need for the ability of the display monitor to be able to report its status. The need for status reporting is increased because the LCD monitors are often greater in number than the prior art CRT monitors and because malfunctions are less obvious. Several methods for providing status information from video displays have been proposed. Embodiments of the present invention comprise a system in which data can be requested by repeating commands, such as turn on, a number of times within a predetermined time interval. Because embodiments of the invention use an existing command, which can be the repeated without affecting the functioning of legacy systems, the need for modification of the airline and monitor systems is greatly reduced.

20 Claims, 8 Drawing Sheets

| Type of Information | Nominal Data Size | Format |
|---|---|---|
| Type of unit (677) | 4 BCD characters | Last 2 digits of base number plus last 2 digits of dash number. |
| Serial Number (679) | 4 BCD characters | Last 4 digits of unit serial number as given on the bar code label. |
| BIT Discretes (623, 625, 627) | 24 BITS+ | Individual discretes formatted into 3 eight-bit words. |
| Operating Time (683) | 6 BCD characters | Represents up to 99,999.9 hours. |
| Operating Cycles (685) | 5 BCD characters | Represents up to 99,999 cycles. A cycle is 1 deploy stow cycle. |
| Hardware Version (681) | 2 BCD characters | Represents up to 99 versions. |
| MOD (681) | 2 BCD characters | Represents up to 99 Modifications. |
| Software version (618) | 2 BCD characters | Represents up to 99 versions. |
| Cage Code (679) | 5 BCD characters | Commercial and government entity code. |

FIG. 6

| Bit Discrete | Type | Function |
|---|---|---|
| Flash alert | Type 2 | The motor controller board has detected a prior occurrence of a failure and has logged the event in flash memory. This is meant to alert maintenance personnel that a fault has occurred even though the unit appears to be operating normally. The BIT data stream is sent with this discrete bit reset to show there has been a prior fault condition. This is meant to be used to indicate that the unit is operating but probably needs service. |
| AC good fail | Type 2 | The power supply has reported the AC power input is not good (usually a power loss). It is meant to inform the Tapping Unit why the display unit is shutting off. |
| DC good fail | Type 1 | The power supply has reported the DC power outputs are not good (usually out of spec). This discrete is meant to inform the Tapping Unit why the display unit is shutting off, and it also provides an alert that the display unit needs service. |
| Motor fail | Type 1 | The motor controller/motor has failed to deploy or stow the monitor. This is meant to alert the flight attendants to check the unit to see if it needs to be manually stowed, or for the flight attendants to instruct the passengers to view a different monitor rather then the failed unit. This also provides an alert that the display unit needs service. |
| Video CCA fail | Type 1 | The video converter board has failed, primarily when it fails POST. This provides an alert that the display unit needs service. |
| Backlight fail | Type 2 | Current drawn by Inverter module is lower then expected, which indicates one backlight has failed, or the portion of the inverter used to drive the backlight is not working. If one backlight has failed, the display unit continues to operate with a reduced brightness display rather then shut itself down. The status stream is sent with the backlight fail BIT discrete reset to indicate the fault condition. This provides an alert that the display unit needs service. |
| (Reserved 1) | TBD | An extra discrete bit reserved for future use. |
| Inverter Fail | Type | Current drawn by Inverter module is much lower then expected, which indicates both backlights have failed, or the inverter is not working. In the current embodiment, the Inverter fail signal is considered an equipment failure only during a power-on self test. If the inverter has a fault, the display unit continues to operate with a blanked screen rather then shutting itself down. The status stream is sent with the Inverter fail BIT discrete reset to indicate the fault condition. This provides an alert that the display unit needs service. |
| Capacitor low | Type 1 | The charge is too low in the capacitor bank that is used for reserve power during the stow process when a power loss occurs, indicating that at least one of the capacitors has failed in any open circuit state. Since this power is needed to guarantee stowing the unit during a power failure, the unit does not attempt to deploy if it detects a Capacitor low fault. Instead, the BIT data stream is sent with this discrete bit set to show the fault condition and then the unit turns itself off, indicating that the unit needs service. |
| Loss of video fail | Type 2 | The video converter board has not seen a video signal for 10 minutes. This does not mean that the display unit needs service, rather, it is meant to inform the Tapping Unit why the 10.4" Retract is shutting off |
| Deploy fail | Type 2 | The motor controller/motor has completed the entire 3-try routine and has given up trying to deploy. This is meant to alert the flight attendants to check to see if there is an obstruction in the way of the monitor that needs to be moved. This does not mean that the display unit needs service; rather it is meant to inform the Tapping Unit why the display unit is shutting off. |
| Thermal limit | Type 1 | The power supply has reported that the sensor temperature has exceeded +85 degrees C, and the 10.4" and the display unit shutting down rather then failing due to overheating, and thus avoiding a safety incident report against the unit. This provides an alert that the display unit needs service. |
| Thermal stress | Type 2 | The power supply has reported that the sensor temperature has exceeded +60 degrees C. The 10.4" Retract continues to operate rather than shut itself down, but the BIT data stream is sent with this discrete bit set to show the fault condition. The unit is operating but is hotter than normal, indicating that the unit probably needs service. |
| (Reserved 3) | | An extra discrete bit reserved for future use. |
| (Reserved 4) | | An extra discrete bit reserved for future use. |
| (Reserved 5) | | An extra discrete bit reserved for future use. |

FIG. 7

DATA REQUEST METHOD WITHOUT USING DEDICATED CONNECTIONS

FIELD OF INVENTION

This invention relates generally to apparatus and methods for communication of data from electronic systems and in particular embodiments, to communication of data from an electronic display unit to a data collection unit using existing wiring.

DESCRIPTION OF THE RELATED ART

Commercial airline travel has become commonplace with many flights being multiple hours in duration. In order to provide entertainment for passengers on commercial flights, airlines have introduced in-flight entertainment systems. These in-flight entertainment systems may vary in complexity from the delivery of audio to a passenger's seat to systems, which are capable of delivering video on demand.

Commercial airline travel has become cost sensitive and airlines have attempted to contain costs in every manner possible. Accordingly, commercial airlines have generally sought to control costs of their in-flight entertainment systems through purchasing systems, which are both as low-cost as possible and are maintainable with minimum costs. In order to accommodate these goals, manufacturers of in-flight entertainment systems have attempted to adopt standards for the in-flight entertainment systems to promote commonality and thereby reduce costs. One of the de facto standards, for in-flight entertainment systems, is the use of a standard ARINC 722 connector to couple in-flight entertainment system display units to aircraft systems. Many display units are interconnected into aircraft systems using a connector defined by the ARINC 722 standard. The ARINC 722 standard defines a connector comprising a twelve contact electrical interface used to connect to a commercial airline display unit. The ARINC 722 standard is available from: ARINC, 2551 Riva Road Annapolis, Md. 21401, or from WWW.ARINC.COM. (Several connectors and pinouts for various uses are given in the ARINC 722 document. The references herein relate to a specific connector and pinout for video monitors as given in the ARINC 722 document.) The defined pinout for the ARINC 722 standard connector is as shown below in Table 1.

TABLE 1

| PIN # | FUNCTION |
| --- | --- |
| 1 | 115 volts AC |
| 2 | +28-volts DC |
| 3 | 28-volts DC ground |
| 4 | 115 volts AC ground |
| 5 | Chassis ground |
| 6 | Power control on |
| 7 | Power control off |
| 8 | On indicator (28-volt DC logic per ARINC 700) |
| 9 | (spare) |
| 10 | (spare) |
| 11 | SS-1 (aspect ratio select 1) |
| 12 | SS-2 (aspect ratio select 2) |

The ARINC 722 standard provides that AC power is provided to the display unit using pins 1 and 4. 28-volts DC is supplied to the display unit using 2 and 3. Pin 5 is a chassis ground pin. Pin 6, power control on, is a momentary contact, which will turn on the display unit when grounded. Pin 7, power control off, is normally at ground potential. When the connection between pin 7 and ground is broken, the unit will turn off, if it is on. Pin 8 provides an "on indicator" signal, which is a 28-volt DC logic level. When a 28-volt DC level is present on pin 8, the unit is on. Pins 9 and 10 are spares. Pins 11 and 12 are largely obsolete and had been used to select aspect ratios in early video projectors.

There is generally also a composite video input on a separate BNC connector to connect the display unit to a video source.

The ARINC 722 connector is a defacto standard, which is used widely in the field of in-flight entertainment systems. The ARINC 722 standard, while adequate for interfacing with a small number of CRT monitors has some shortcomings when interfaced with the more modern individual Liquid Crystal Displays (LCDs). It is desirable, however, to continue use of the ARINC 722 connector for several reasons. A first reason it is desirable to continue the use of the ARINC 722 standard connector is that spare connectors are widely available. If a new connector were to be chosen, then that connector would also need to be maintained by airline maintenance as a spare. The ARINC 722 connector has the advantage that it is already a defacto standard and spares are commonly available. Additionally, any proposed additional or replacement connector would likely not meet with universal acceptance by all the in-flight entertainment system manufacturers and the airline manufacturers.

One reason that the ARINC 722 interface has been found lacking is the growing trend of using LCD displays, within modern commercial aircraft instead of centrally located CRT displays. The individual LCD displays, also known as line replaceable units (LRU) or displays, are commonly far more numerous when installed in an aircraft than installed CRT displays would be. The ARINC 722 interface, however, provides no defined method of obtaining status data from the display unit to which it is connected. In addition, many of the old CRT display units were visible throughout the airline cabin and were always in a display position, i.e., they did not retract. Because non-retracting CRT units could be seen easily by airline personnel, they could easily detect a malfunctioning display. Malfunctioning LCD units are not as easily detected. There may be many more LCD display units present in an aircraft, as many as one per airline seat. Additionally, LCD display units may retract so their screens are protected while not in use. Generally LCD equipment also has a smaller viewing angle than CRT systems and malfunctioning units are more likely to go unnoticed than a centrally located easily visible CRT. Accordingly, manufacturers such as Boeing have begun to demand that status data from such display units be available without having to physically inspect each unit. For example, the following information from the display is desirable: the display name, i.e., LCD display unit, the display serial number, the physical location of the display, the hardware modification level of the display, the software version of the display, and operational status information for the display. Status information for an LCD display includes such items as backlight failure, motor retract failure, power supply failure, and electronics failures. In addition, such information as cumulative time that the display has been in service is also desirable.

The problem of providing operating status and display unit information is compounded by the fact that display units are currently wired through ARINC 722 connectors in a large number of currently deployed aircraft. Adding additional data connections would involve replacement of ARINC 722 connectors with another type of connector or adding an additional connector. In addition, further difficulties are encountered because additional connectors and additional data lines may not be present in current aircraft. Adding additional wires to the current connector or adding an additional connector may involve major rewiring of the aircraft at great expense. In addition to the expense of rewiring, some manufacturers, such as Airbus Industries, require that when any rewiring of an aircraft takes place the aircraft must be recertified. The expense of aircraft rewiring, the additional down time of the aircraft and the expense of recertification of the aircraft makes any such additional wiring costly.

SUMMARY OF THE DISCLOSURE

To overcome limitations in the prior art described above and to overcome other limitations that will become apparent upon reading and understanding the present specification, the present specification discloses an improved display interface. This improved display interface can make use of current connectors and aircraft wiring to provide information about the displays to aircraft systems. Embodiments of the present invention superimpose a data transmission on the display's "on indicator" status signal, which is present on pin 8 of standard ARINC 722 connectors. The data transmission will appear as an acceptable level of noise to current systems because the voltage deviations used to represent the data transmission are of sufficiently low amplitude. The data transmission superimposed on the "on indicator" status signal can be retrieved, in embodiments of the invention, without degrading performance of the display unit, or interfering with the performance of legacy systems.

Other embodiments of a system in accordance with the principles of the invention may include additional aspects and alternative implementations. One such aspect of the present invention is the ability of a display to provide information as to its status on demand, whether in the aircraft or not, for example to assist in troubleshooting display problems. Additionally, the present invention also can provide the ability for display units to provide real time status information as to their function. For example it is possible to detect display units which have failed to deploy properly, for example where a passenger has placed a coat or an article of clothing in the path of the display thereby prevented the display from fully deploying.

These and other advantages and novel features, which characterize the invention, are particularly pointed out in the included claims. For additional understanding and clarification of the invention, its advantages and variations, reference should be made to the accompanying drawings and descriptive matter, which illustrate and describe specific examples of embodiments of the invention.

BRIEF DESCRIPTION OF THE DRAWINGS

Referring to the accompanying drawings in which like reference numbers represent corresponding parts in all the drawings.

FIG. 6 is a tabular illustration of a data format as may be used with embodiments of the invention.

FIG. 7 is a table listing the Built In Test (BIT) discretes in the order that they are transmitted in the preferred embodiment.

DESCRIPTION OF PREFERRED EMBODIMENTS

The accompanying drawings illustrate descriptions of exemplary embodiments of the present invention. It is to be understood that many other non-illustrated embodiments may be practiced consistent with the present disclosure, as various implementations may be devised and structural changes made without departing from the scope and spirit of the invention disclosed herein.

According to one aspect of the invention an embodiment of the present invention provides a method and apparatus for obtaining data from an in-flight entertainment system display unit, as may be used in present commercial aircraft.

Figure 1:
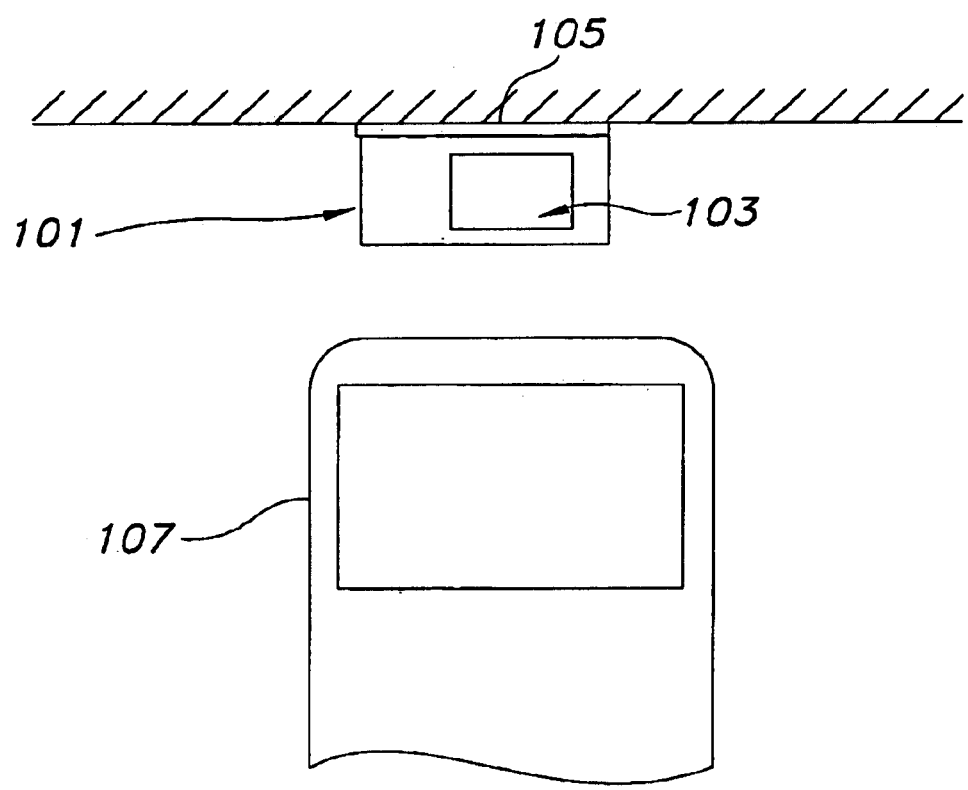
FIG. 1 is a graphic illustration of an example environment of an embodiment of the invention.

FIG. 1 is a graphical illustration of an environment wherein the present invention may be practiced. FIG. 1 illustrates a portion of the passenger area within a conventional commercial airliner. Illustrated in FIG. 1 is a display unit 101. The display unit 101 is attached to an aircraft overhead compartment via a hinge 105. The display unit 101 contains an LCD display 103. A typical display unit may be positioned immediately above a seatback 107 for viewing by a commercial airline passenger.

Figure 2A:
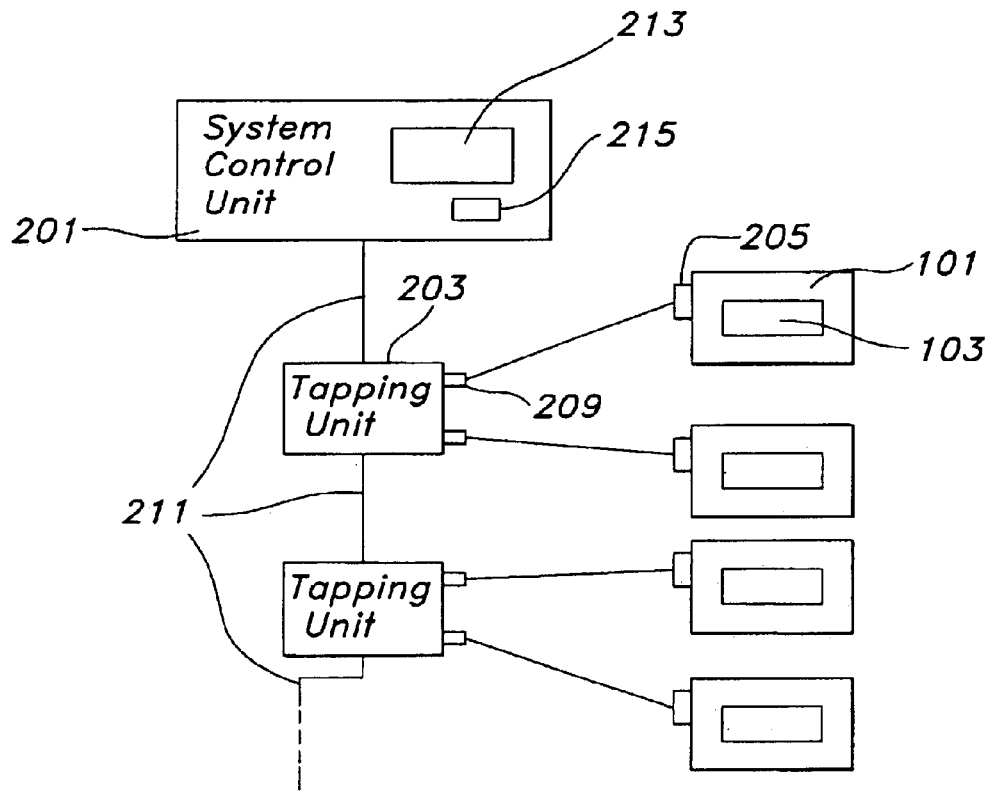
FIG. 2A is a block diagram of a typical interconnection topology, in which individual displays are coupled through a tapping unit to a system control unit.

FIG. 2 is a block diagram illustrating a typical topology for interconnection between a display unit 101 and an aircraft system control unit 201. In the illustrated embodiment a liquid crystal display (LCD) 103 is disposed within a display unit 101. The display unit 101 is connected to a tapping unit 203. The tapping unit 203 is so named because it generally taps into video and control lines, which run the length of the aircraft via the aircraft bus 211.

The display unit 101 is connected to the tapping unit 203 through an ARINC 722 connector 205 on the display unit 101 side and through a DB connector 209 on the tapping unit side. The tapping units, e.g. 203, are interface units between a system control unit 201 and display units 101. The ARINC 722 connector 205 is a circular connector, which represents a standard interface used within present commercial aircraft. Part 1 of the ARINC 628 specification specifies the use of an ARINC 722 connector. ARINC 722 connectors typically connect a video display through a tapping unit 203. Tapping units are commonly coupled into the aircraft bus 211 and then further coupled into the system control unit 201. A typical tapping unit 203 taps into the aircraft bus 211, receiving serial commands from the system control unit 201 and connecting to aircraft power and video. The tapping unit 203 provides power and video to the display units 101, to which it is connected, and also decodes serial commands from the system control unit 201, in order to relay the commands to the appropriate display unit 101. Commonly one tapping unit 203 will control two displays 101.

The system control unit 201 commonly comprises a display 213 and memory 215 for use by aircraft flight personnel in ascertaining the status of and controlling the operation of individual display units 101. The system control unit 201 provides commands to the tapping unit 203. For example the system control unit 201 can provide a series of delayed deploy commands to the display units 101 in order to sequentially deploy the display units 101. Display units 101 are typically deployed sequentially as to prevent a large surge current, which might be encountered, if all the units are deployed at the same time.

Figure 2B:
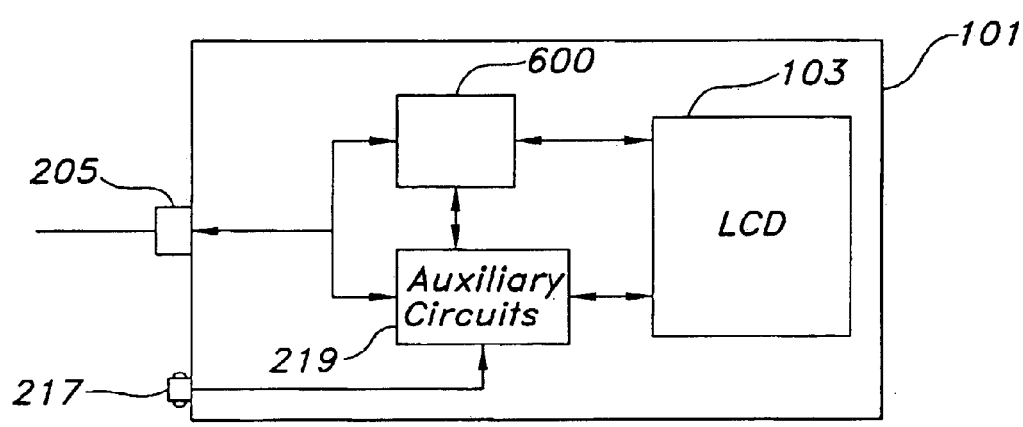
FIG. 2B is a block diagram illustrating pertinent subsystems within a typical display unit 101.

FIG. 2B is a block diagram illustrating pertinent subsystems within a typical display unit 101. In addition to an ARINC 722 connector, each display unit 101 typically contains a BNC connector 217 for the purpose of coupling composite video into the display unit 101. The display unit 101 typically comprises the LCD display 103, which is driven by LCD driver circuits contained within the auxiliary circuitry block 219. The auxiliary circuitry block 219 receives video through a video connector 217 and processes it for display on the LCD 103. In addition the auxiliary circuitry block 219 provides such functions as providing power for the backlight of the LCD 103, deploying and stowing the display unit 101, as well as for receiving commands through connector 205, and providing status information to the status reporting circuit 600. The status reporting circuit 600 couples serial data regarding various parameters of the display unit 101 to connector 205 in order to provide the tapping unit 203 with status information on the individual display unit 101, which can be further communicated to the system control unit 201.

The tapping unit connector 209 is commonly a DB type connector 209 similar to those used on personal computer systems. The DB connector 209 at the tapping unit typically has 10 pins and a coaxial cable connector (not illustrated) disposed in the middle of the connector. The DB connector is of approximately the same size as a standard DB-15 connector as commonly used with personal computer systems.

The classical method of adding capability to a standardized electronics unit is to use any spare pins, which are present. There are two spare pins specified on the ARINC 722 connector, as listed in Table 1. Using the two spare pins (9 and 10) on the ARINC 722 connector, however, would use up the two remaining spare pins and might preclude future expansion. In addition, there is no assurance the these pins on current systems are not wired to ground or a chassis connection.

It is desirable to be able to access a variety of status data from the display unit 101. Status information can include such useful information as failure of the display unit 101, failure of the backlight (not shown) within the unit 101, high temperature within the unit 101, failure of the retract motor within the unit 101, as well as unit information such as the serial number of the unit, the version of hardware within the unit, the version of software within the unit, and the location of the unit within the aircraft. In some proposed display unit implementations, such status information is communicated via a separate connector using an ARINC 485 two-wire protocol. (ARINC 485 is currently in draft form.)

The ARINC 485 is a two-wire bidirectional interface. Other equipment within the aircraft may also typically utilize the ARINC 485 standard. ARINC 485 is a specification that is similar to the Electronic Industries Association (EIA) RS485 specification. ARINC 485 describes a protocol specifying commands and addressing to be used with a ARINC 485 two-wire serial bus. The ARINC Corporation, which maintains the ARINC standards, has proposed adding an additional connector and an ARINC 485 protocol for the purpose of retrieving status information from the display unit 101. This proposal has a serious disadvantage in that it requires another connector be placed on the display unit 101. The addition of a new connector requires totally different cabling within the aircraft, as well as requiring the cost of a new connector placement within the display unit and circuitry to implement the ARINC 485 protocol.

A secondary proposal proposed by some is that the spare pins within the ARINC 722 connector be utilized for an ARINC 485 protocol. This proposal is disadvantageous in that it would thereby use the final remaining two spare pins within the unit, and would require the installation of an ARINC 485 transceiver unit and the intelligence to drive it. Since the only communications between the System Control Unit 201 and a display unit 101 are the three messages "turn on," "turn off" and "what is your status?" a simpler solution than the installation of an ARINC 485 interface is desirable. In addition, the installation of an ARINC 485 interface would require the installation of additional wiring between the display 101 and tapping unit 203, as well as all that adding the additional wiring would entail.

In general there are two types of status signals. The first type may be referred to as a "static" status signal. A static status signal is one that continually indicates the status of a parameter. An example of a "static" status signal is the "on indicator" signal on pin 8 of an ARINC 722 connector. Pin 8 of an ARINC 722 connector provides a nominal 28-volt "on indicator" signal indicating that the display unit 211 is operating. When the unit is not operating pin 8 of an ARINC 722 connector provides a nominal 0-volt signal indication that the display unit 211 is off. The "on indicator" signal on pin 8 may be examined at any time to determine the current operating status of the display.

Other units may provide "dynamic" status signals periodically at certain intervals or asynchronously, for example upon change of status of the unit. Still other units may provide status information on demand. "Dynamic" status signals differ from "static" status signals in that "dynamic" status are not always present. "Dynamic" status signals may be provided in a variety of ways well known in the art. For example "dynamic" status signals may comprise serial data, or parallel data synchronized with a synchronizing clock. Serial data is commonly provided through Universal Asynchronous Receiver Transmitter (UART) devices, which are well known in the art.

The remote "on indicator" of pin 8 of an ARINC 722 connector provides a 28-volt DC "static" type status signal, which may be used, for example, in driving a remote "on indicator" lamp.

Figure 3:
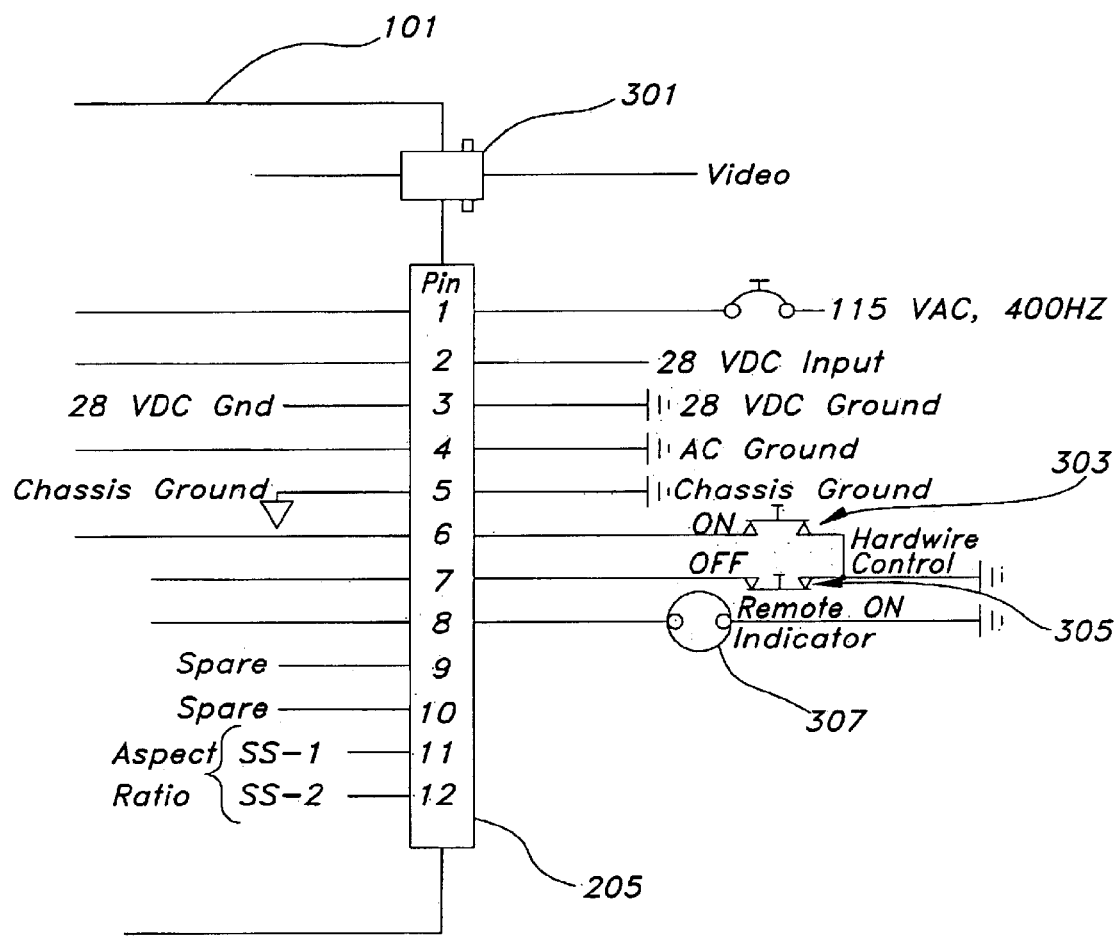
FIG. 3 is a schematic diagram illustrating typical display unit wiring may be found on a display employing a standard ARINC 722 connector.

FIG. 3 is a schematic diagram illustrating typical display unit wiring may be found on a display employing a standard ARINC 722 connector. A typical video display unit 101 of a commercial airline in-flight entertainment system commonly comprises two connectors. The first connector 301 is a BNC-type connector, which is used to couple video into the display unit. The second connector 205 is typically an ARINC 722 connector. The ARINC 722 standard dictates a connector with 12 pins, labeled 1–12 as illustrated in the nominal configuration of FIG. 3. ARINC 722 dictates the following pin assignment on an ARINC 722 connector. Pin 1 is designated as 115 VAC, 400 HZ. This is the AC power input to the display unit 101. Pin 2 is the 28 volts DC (VDC) input. This is the DC voltage that is used by the electronics within the display unit 101 for turn on/turn off logic. Pin 3 is designated as 28 VDC ground. Pin 4 is designated as 115-volt AC 400 HZ ground. Pin 5 is designated as chassis ground, and is the ground that is connected to the display unit chassis. Pin 6 is designated as the on-input to the display unit 101. ARINC 722 designates that providing a momentary contact between pin 6 and ground will turn a unit on. For this purpose, normally open momentary switch 303 is illustrated. When pin 6 of the connector 205 is grounded, for example by momentarily closing the switch 303, the unit accepts this as a signal to turn on. Pin 7 of the connector is designated as an off-control. ARINC 722 designates that when pin 7 is removed from a ground connection, the unit will turn off. To illustrate a hard wire control of this pin, switch 305 is a normally closed momentary contact switch. When switch 305 is pressed the contract between pin 7 and ground is temporarily interrupted. The display unit 101 interprets this temporary interruption of ground path as a signal to turn the unit off. Pin 8 is designated as a remote on-indicator. When the display unit 101 is on, the display unit 101 provides a nominal 28 volts to pin 8. This voltage may be used to turn on a remote indicator lamp 307, thereby signifying that the display unit 101 is on. When the display unit is off, the display unit 101 provides a nominal ground voltage to pin 8, thereby turning a remote "on indicator" such as 307, off. Pins 9 and 10 are designated as spare pins. Pins 11 and 12 are designated as aspect ratio pins. Pins 11 and 12, which had been intended to be used to discriminate between different projection formats are largely obsolete now.

Figure 4:
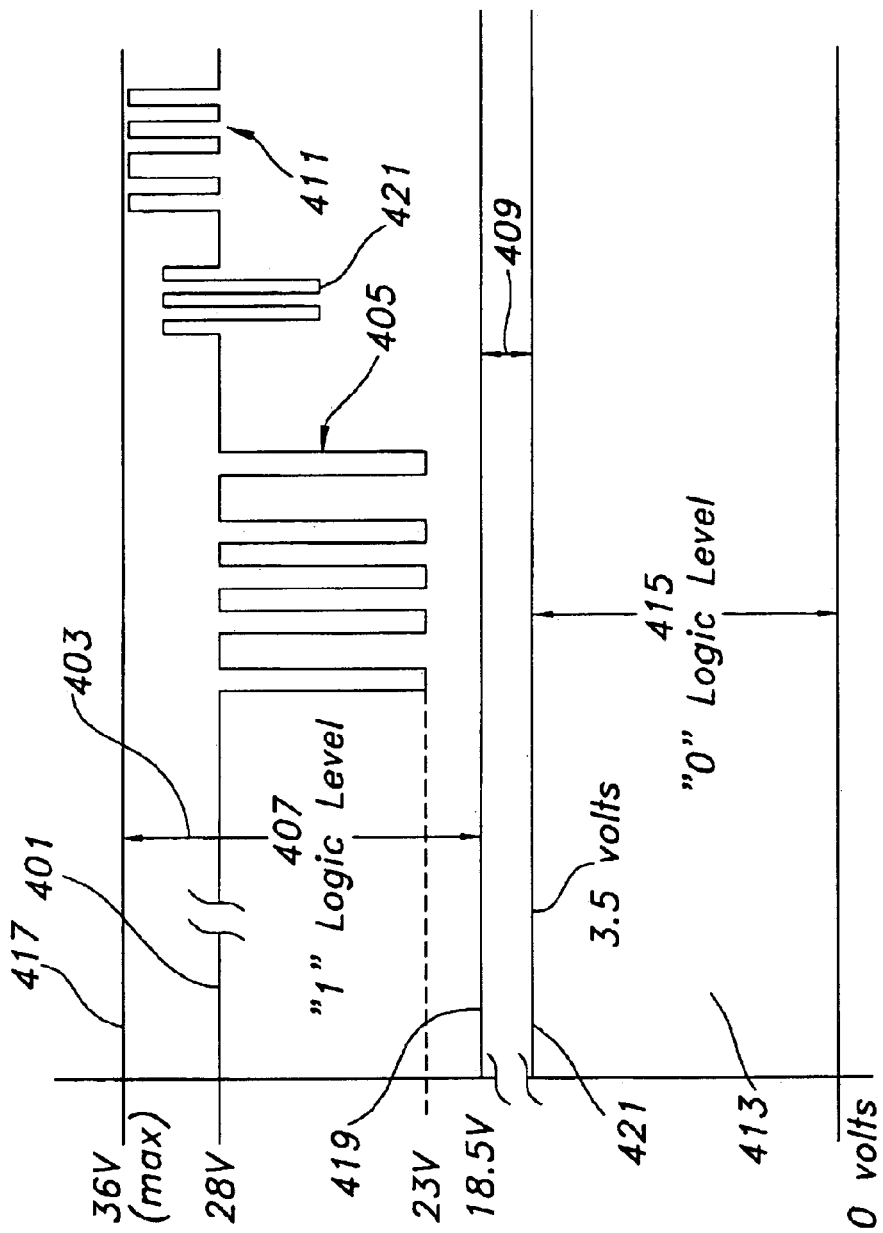
FIG. 4 is a graphical illustration of a 28-volt "on indicator" signal from ARINC 722 connector also illustrating a data signal imposed upon the 28-volt "on indicator" signal.

FIG. 4 is a graphical illustration of a 28-volt remote "on indicator" as may be provided by pin 8 of an ARINC 722 connector. The "static" status signal 401 illustrated in FIG. 4 is a nominal 28-volts signal, which indicates that the display unit is operating. The remote "on indicator" is a digital on-off signal, i.e. is either a nominal 28-volts (logical "1" value) indicating that the display unit is on or is a nominal 0 volts (logical "0" value) indicating that the unit is off. Because the remote signal is an on-off digital type signal, it has a great deal of noise immunity. The nominal 28-volt remote "on indicator" 401 may in actuality vary between a maximum voltage represented by point number 417 on the graph, and a minimum voltage represented by point number 419 on the graph. The level between the maximum voltage 417 (36 volts according to the ARINC 720 specification) and the minimum voltage 419 (18.5 volts according to the ARINC 720 specification) which is recognized as a "1" logic level, is a range of 17.5 volts indicated at 407 in FIG. 4. Any value within the range 407 will be recognized as a logical "1". On the other hard, any voltage level between 0 volts and a maximum logic level 421 (3.5 volts according to the ARINC 720 specification) will be recognized as a "1" logic level (range 415). This leaves an undefined range 409 between level 419 and level 421 which is recognized as neither a logic "0" level or a logic "1" level. This range 409 may be small or even nonexistent depending on the specification and the specific application details. The undefined range 409 is 15 volts. According to ARINC 720 specifications any logic level in the range 407 between levels 419 and 417 will be recognized as a logic "1" level, indicating that the display unit 101 is on. It does not matter which level within the range 407 is present on pin 8 (the remote "on indicator" signal), as long as it is within the logic "1" limits. A signal can be imposed on the "on indicator" signal and as long as the excursions of the imposed signal are within the specified "1" logic level 407. As long as the excursions of the imposed signal are within the specified "1" logic level 407 any prior art tapping unit connected to the remote "on indicator" pin 8 of the ARINC 722 connector will recognize that the display unit 101 is in an on-condition. Therefore, signals such as 405, 421, or 411 may be imposed upon a nominal 28-volt line 401 without degrading the remote "on indicator" function of the "on indicator" signal present on pin 8 even with respect to prior art units. The signals 405, 421 and 411 do not represent the only signals that may be imposed within the logic range 407. A preferred embodiment uses signal 405, which is a negative 5-volt excursion, i.e., between 28 volts and 23 volts, to represent a data signal.

Thus, in accordance with an embodiment of the invention, the 28-volt remote "on indicator" 401 may have a 5-volt serial data signal 405 imposed upon it, as illustrated in FIG. 4. If the data signal 405 falls within the nominal "1" logic of the original 28-volt "on indicator" signal 401, imposing data upon the 28-volt remote "on indicator" does not compromise the original function of the "on indicator" signal. A variety of different serial signals, such as tones, could be superimposed on the 28-volt line. By limiting a superimposed signal to an excursion between a maximum value indicated at 417 and a minimum value indicated at 419, the data signal will appear as ordinary noise to prior art tapping units 203, which are not equipped to handle a non-static data signal.

Because a data signal such as signal 405 is acceptable from the point of view of the ARINC 720 specification, such data may be generated by the display and superimposed on the 28-volt "on indicator" line in a variety of circumstances. Such data can be reported by transmitting it superimposed on the 28-volt "on indicator" for such occurrences as power on self test, failure of the unit, change in status of the unit, or a variety of other circumstances. By superimposing a signal on the existing 28-volt "on indicator" line legacy systems can use existing wiring and connections. The cabling to the display unit 211 need not be changed, the connector of the display unit 211 need not be changed, no additional connector need be added to the display unit 211 and no violation of the ARINC 722 standard occurs.

Figure 5A:
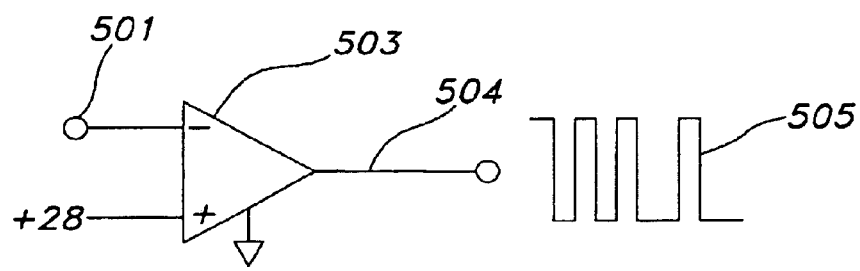
FIG. 5A is a graphical illustration of the use of a comparator to recover a data signal imposed upon the 28-volt ARINC 722 "on indicator" line, such as illustrated in FIG. 4.
Figure 5B:
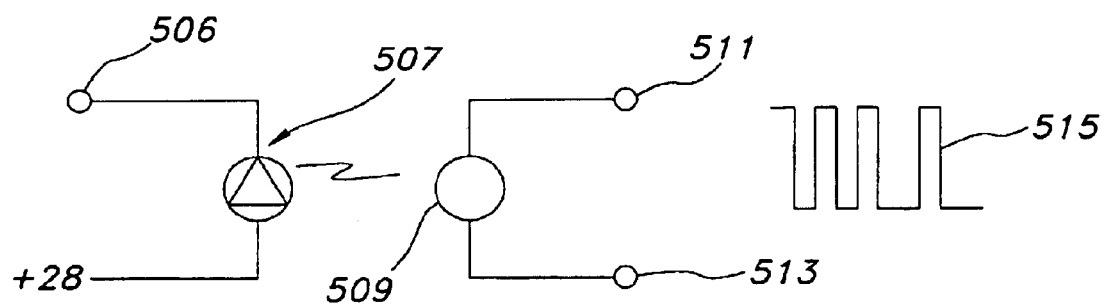
FIG. 5B is a graphical example of the use of an optocoupler to recover the data signal, which has been imposed upon a standard ARINC 722 "on indicator" signal, as shown in FIG. 4.

FIG. 5A illustrates one embodiment of the recovery of data from the 28-volt signal using a comparator. The comparator 503 has as a f first input comprising a reference voltage set at approximately the midpoint of the voltage swing of the data signal. Comparator 503 has, as a second input 501, the "on indicator" signal from pin 8 of the ARINC 722 connection. When a signal such as 405, is provided to the input 501 of the comparator 503 the result is that serial data 505 imposed on the 28-volt "on indicator" signal is decoded and appears on the output 504 of the comparator 503. A second circuit, which may be used to retrieve a signal coupled into the 28-volt "on indicator" line, is shown in FIG. 5B. FIG. 5B is an illustration of an optocoupler. The anode of a light emitting diode 507 of the optocoupler is coupled to a 28-volt reference supply. The cathode of the light emitting diode 506 is coupled to the 28-volt "on indicator" line from pin 8 of the ARINC 722 connector, which contains the imposed data signal. The variations in the data signal imposed on the 28-volt "on indicator" signal are coupled to the cathode of the light emitting diode 507 of the opticoupler, which causes the light emitting diode 507 to turn on and off. The phototransistor 509 receives the light pulses from the light emitting diode 507 and generates a voltage between terminals 511 and 513 in response to the light emitting diode 507. The voltage generated between terminals 511 and 513 represents the recovered signal 515 that had been imposed upon the 28-volt "on indicator" line.

The previous two signal recovery embodiments are meant as illustrations only. There are a variety of ways, well known in the art, to recover the signal imposed upon the 28-volt "on indicator" line. The recovery circuitry may be contained, for example, within a tapping unit 203. The tapping unit can contain a microprocessor or other decoder circuitry connected to the aircraft bus 211 and can pass the demodulated data to the system control unit. The status information of the display units 101 may be monitored by on-board personnel at the system control unit as well as recorded in memory units 215 of the system control unit 201 for downloading to maintenance personnel.

FIG. 6 is a tabular list of data, which is transmitted, in a preferred embodiment of the present invention. The table of FIG. 6 contains three columns. The first column, of the FIG. 6 table, indicates the type of information, which is transmitted. The second column, of the FIG. 6 table, indicates the nominal data size of that particular type of information. The third column, of the FIG. 6 table, contains a format in which the data is sent.

The first type of information, which may be sent, is the type of unit 677. The type of unit in the illustrative preferred embodiment encompasses four BCD characters allowing values ranging from 0 to 9999. A format for the type of unit 677 is the last two digits of a base number plus the last two digits of a dash number indicating type of unit and version.

The serial number 679 is made up of four BCD characters. The four BCD characters comprise the last four digits of the unit serial number as given on the bar code label.

The operating time 683 is made up of 6 BCD characters, which;represents up to 99,999.9 hours of operation.

The operating cycles variable 685 is made up of 5 BCD characters representing up to 99,999 cycles. A cycle is one deploy/stow cycle of the video display.

Hardware version 681 comprises 2 BCD characters, which can represent up to 99 versions of hardware.

Mod 681 comprises 2 BCD characters, which can represent up to 99 modifications.

The software version 681 is made up of 2 BCD characters, which represent up to 99 different software versions.

The CAGE code, which is 5 BCD characters, is a commercial and government entity code.

The BIT (built in test) discretes, in the present embodiment, comprise 16 bits of data which represent discrete bits of data formatted into 2 eight-bit words. In addition one byte of data incorporated into a third spare BIT word 8 bits in length is included for expansion purposes. The bit discretes are divided into 3 different bit discrete words, bit word 1, bit word 2 and bit word 3. Individual bit discretes fall into one of the three categories as a type 1 BIT discrete, type 2 BIT discrete or type 3 BIT discrete. A type 1 BIT discrete is one wherein a failure, which is so serious that the unit must be shut down, has occurred. BIT type 2 discretes are failures which may be transients, and/or not so serious that the unit need be shut down. BIT type 3 words are reserved for future use and have not as yet been defined. The BIT discretes are illustrated in tabular form in FIG. 8.

FIG. 7 comprises a table in which the first column gives the name of the BIT discrete, the second column indicates whether the BIT discrete is type 1 or type 2. The third column of FIG. 7 indicates the function of the BIT indicator, that is it indicates that error is being flagged.

The bit discrete flash alert is a type 2 BIT discrete which will not shut the unit down. Only type 1 BIT discretes will cause a unit to shut down. Flash alert indicates that the motor controller board has detected a prior occurrence of a failure and has logged the event in flash memory. An active flash alert discrete indicates that a fault has occurred, even though the unit may appear to be operating normally. The BIT data is sent with the flash alert bit discrete reset (all BIT discretes are active low) to show that there has been a prior fault condition, indicating that the unit is operating but probably needs service.

AC good fail is a type 2 BIT discrete. This indicates that the power supply has reported that the AC power is not good and usually indicates a power loss. The AC good fail BIT discrete can be used to inform the tapping unit why a display is shutting off.

The DC good/fail BIT discrete is a type 1 discrete, meaning that if a DC good fail condition exists the power supply has reported that the DC power supplies are not good and that the unit will shut off. Because the DC good/fail BIT discrete is a type 1 discrete the display unit status will be logged into flash memory upon occurrence of a DC good/fail or any other type 1 discrete failure. The present design does not log this to flash memory since unstable DC power forms may cause the flash memory to be corrupted.

The motor fail BIT discrete is a type 1 BIT discrete indicating that the motor or controller has failed to deploy or stow the motor. A motor fail indication is meant to alert the flight attendants to check the unit to see if it needs to be manually stowed or to instruct the passengers to view a different monitor. This type of failure, as all type 1 BIT failures, shuts down the video display unit and logs the status of the display at the time of the BIT type 1 failure into flash memory.

The video CCA fail is a type 1 BIT discrete indicating that the video board has failed. A video CCA failure occurs primarily when the video board fails a power on self test (POST). The video CCA fail BIT discrete provides an alert that the display needs service and since it is a bit word 1 type discrete it shuts the unit down.

Back light fail is a type 2 BIT discrete that indicates that the current drawn by the inverter module is lower than expected, which indicates one back light has failed or the portion of the inverter used to drive that backlight is not working. If one back light has failed, the display unit continues to operate with a reduced brightness rather than shutting itself down. The status data stream is set with the back light fail BIT discrete reset to indicate the fault condition. Inverter fail is a type 2 BIT discrete that indicates that the current drawn by the inverter module is much higher or lower than expected, which indicates either both back lights have failed or the inverter is not working. In some design approaches, this is not necessarilly a fault if the "fault" is indicated during normal operation. This is because the video converter card may turn off the back light to save power or to avoid displaying unintended images such as video "snow" at the end of a video tape. In the current embodiment, the Inverter fail signal is considered an equipment failure only during power-on self test. If the inverter has a fault, the display unit continues to operate with a blanked screen rather than shutting itself down. This is to assist in diagnostics and troubleshooting. The status data stream is set with the Inverter fail BIT discrete reset to indicate the fault condition.

The capacitor low is a type 1 BIT discrete that indicates that the charge is too low in the capacitor bank that is used for reserve power during the stow process when a power loss occurs. The capacitor low BIT discrete indicates that the electronic spring capacitor's voltage is lower than expected indicating that at least one of the capacitors has probably failed. This test is only performed when the capacitor bank is being charged normally during a power on sequence. The video display continues to operate because capacitor low BIT is a type 1 failure. The status data stream is sent with the capacitor low bit reset to show the fault condition.

The loss of video fail BIT discrete is a type 2 discrete. An activation of the loss of video fail BIT discrete indicates that the video board has not seen a video signal for ten minutes. The loss of video fail BIT discrete is meant to inform the tapping unit why the video display is off.

The deploy fail bit discrete is a type 2 BIT discrete and indicates that the motor controller or the motor has completed a three try routine, in which it has attempted to deploy three times and has failed. The deploy fail BIT discrete is meant to alert the flight attendants to check and see if there is an obstruction that needs to be moved in the way of the monitor. The deploy fail BIT discrete does not necessarily mean that the display unit needs service, rather it is meant to inform the tapping unit why the video display is off.

The thermal limit BIT discrete is a type 1 discrete. The thermal limit BIT discrete indicates that the power supply has reached a temperature which exceeds 85° C. and that the video display is shutting down rather than fail due to excess overheating.

The thermal stress BIT is a type 2 discrete which indicates that the power supply has reached a temperature exceeding 60° C. The video display continues to operate in such a condition but the data is sent with the thermal stress discrete bit reset (active) to show that a fault condition is present. There are also five bit discretes reserved for future use. All bit discretes are high when indicating normal operation. That is a zero value of the bit discrete is an active value that indicates a fault is present.

Figure 8:
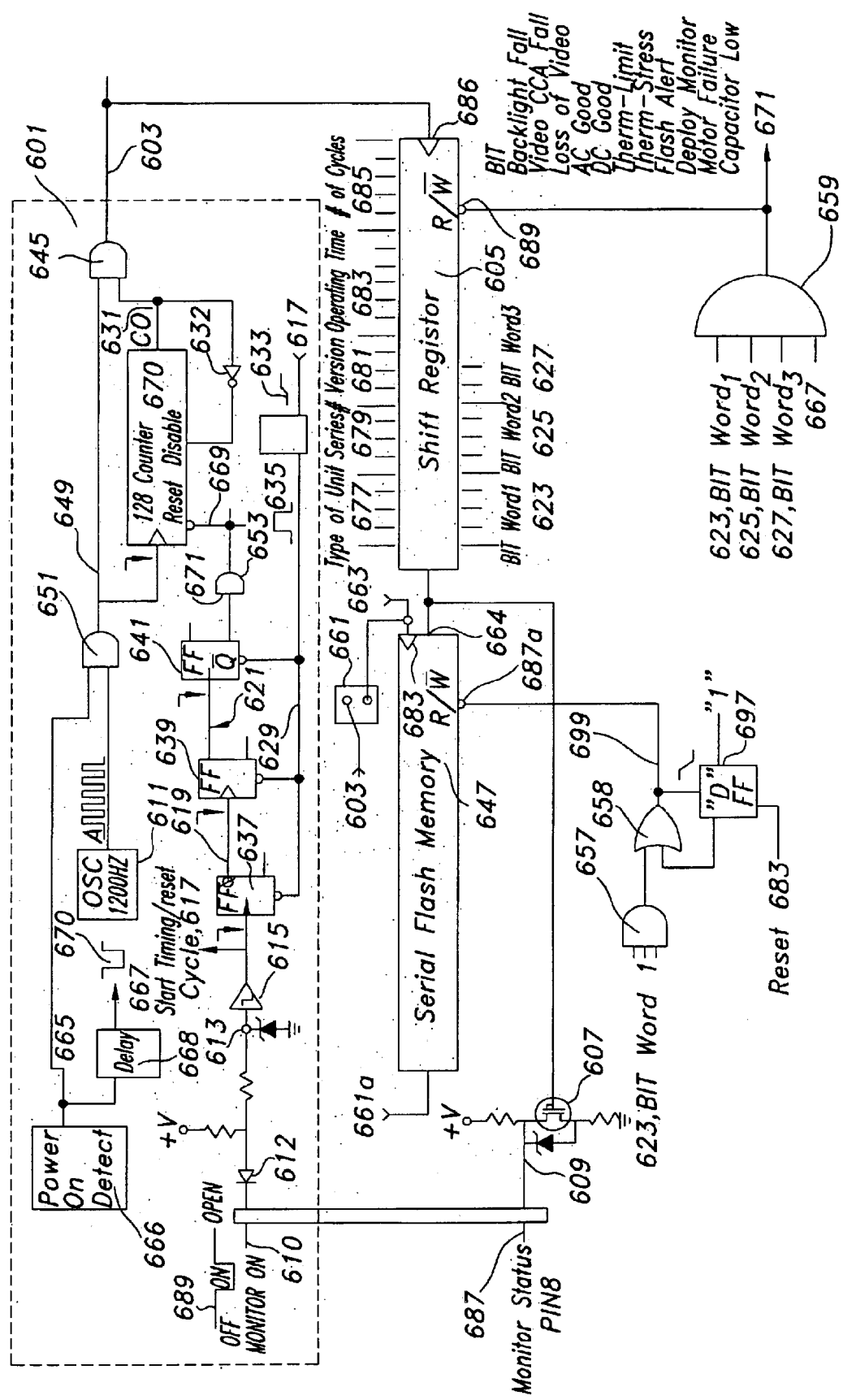
FIG 8 is an exemplary circuit diagram, which may be used to provide status data by superimposing the data on the 28-volt "on indicator" signal as illustrated in FIG. 4.

FIG. 8 is a schematic illustration of an exemplary form of the status reporting circuit 600 of FIG. 2B. Circuit 600 may be used to create a data signal containing unit status information and imposed it upon the 28-volt "on indicator" line. By superimposing a data stream on the 28 volt "on indicator", on pin 8 of the video display unit 101, a great deal of information concerning the status of the video display unit 101 can be communicated to the outside world, for example to a tapping unit. Status data from the video display units 101 can be sent out continuously, but to do so would involve reporting a great deal of repeated data and would require a processing ability at the tapping unit which could receive such an amount of data. To efficiently use the data reporting system, data is sent from the display units 101 upon the occurrence of certain conditions. The first condition in which the data is reported by a video display is when the video display unit powers on. When a video display unit 101 powers on there is a brief delay to allow systems such as the LCD back lighting and high voltage systems to stabilize. After allowing a brief interval for circuits within the display unit to stabilize, the data concerning the status of the unit is sent to the tapping unit. In this way if a video display unit has been commanded on and is not working properly the command can be sent to turn it back off.

A second condition in which it is desirable to have a video display unit send data is the condition where a fault is detected. It is desirable to send status data when a fault has been detected in order that in-flight personnel can be provided with an opportunity to cure the problem. For example, if the video display unit is commanded to turn on and attempts to deploy three times and is stopped by some obstruction, such as a passenger placing a coat or garment in the way of the way of the deploying video unit, a fault condition is generated. If flight personnel are notified of this fault condition they may then investigate the cause of the fault. In the case where the inability of the video display to deploy properly is due to an obstruction of the video display unit the problem can be corrected.

Another case in which it would be valuable to have status data from the video display unit is in the case in which a serious fault that caused the shutdown of the unit was detected. In such a case airline personnel could be notified that such a fault had occurred. Airline personnel could place the failed unit on a rep air needed report and could instruct the passenger, whose video unit had failed, that they must view any entertainment from an alternate video display unit. In the case of a failure that disables the video display unit it would also be advisable that the nature of the failure be recorded within the video display unit so that repair personnel would have an indication to what fault had rendered the video display unit inoperable. Such failures are logged in flash memory for access by maintenance personnel.

Another circumstance in which it would be valuable to have the data reported from a video display unit is upon request. By having a mechanism to request the status of a video display adapter the status of the video display could be checked whenever desired. The ability to request status information from a video adapter would be useful, for example, when a movie were about to start and in-flight personnel desire to check to see if all video display adapters were functioning properly. It would also be useful to have the ability to request status from the video display unit for troubleshooting purposes. In other words, a display unit that had been removed from an aircraft could be checked for functioning simply by requesting the status electronically from the display unit without a technician ever having to open the unit. This would be helpful in troubleshooting procedures when a technician had a unit on the bench. A technician could connect a test unit via an ARINC 722 connector to a video display unit and then interrogate the display unit to find out the source of the difficulty with the unit. This would save the technician from opening the unit and discovering that, for example, a back lighting lamp had burned out and that there were no back lighting lamps in stock. In such a case where the part needed to fix the unit is not on hand the technician would merely close the unit, mark it and wait for the necessary part to be received. By ascertaining the source of problems via a remote status reporting the technician could then save the trouble of opening the unit until a new part to replace the failed one was obtained.

To request data a video display unit may be turned off and on. Since the video display unit sends status data upon turn on, the unit will send out its status data. Turning the video display unit off and on is a simple solution to the problem of on demand status data requesting. However turning the video display unit off and on it has the drawback that every time a status is required from the unit it will go through a stow and deploy cycle. This stow and deploy cycle might not be objectionable if the unit were being serviced, however, if the unit were in place in a commercial airline passengers might find such a stow and deploy cycle annoying.

The same problem exists with finding a method to request data as existed finding a method to obtain the data, that is the fact that the ARINC 722 connector has become a de facto standard. Because the ARINC 722 connector has become a de facto standard within aircraft display systems there is great resistance to either adding connections to the existing interface or to adding an additional interface. The ideal solution then would be to find some method to request data using existing connections. Fortunately data can be requested within the context of the current ARINC 722 connections.

Within the ARINC 722 connector is a power control on input on pin 6. Providing a connection between pin 6 and ground turns on the video display unit. The connection between pin 6 and ground can be removed or reconnected at will once the unit is on, and will have no further effect on the unit. Removing a connection between pin 7 of the ARINC 722 connector and ground turns off the unit. Once the unit is turned on the input to the display unit on pin 6 has no further effect on the unit and therefore may be used for another purpose, i.e. to request status data be sent from the unit.

Once the unit has been turned on, pin 6 is available to communicate a data request to the display unit. There are some constraints on using pin 6 to request data from the video display unit. One of the constraints is that of backward compatibility. Current units may have their pin 6 connected to a tapping unit via a long run of wiring. Because pin 6 may be connected to significant amount of wiring, and because an aircraft is a noisy environment considerable noise may be present on the connections to the unit. Although the unit has no further use for pin 6 once the unit has been turned on it is advisable that noise appearing on pin 6 not be mistaken for data status requests. Any signal used for a data status request therefore must be significantly distinguishable from noise to make the likelihood that noise will trigger a data request small. A data request signal must therefore be sufficiently distinguishable from noise so as to make random noise transients unlikely to trigger a data reporting cycle.

There are many candidates for a distinct signal sufficiently distinguishable from noise. One protocol, which can serve as an exemplary method of requesting data, has been implemented in the present embodiment. The protocol used to request data from a video display unit is the grounding of pin 6 the power control on line, three times within a period of 3 seconds. The grounding of the power control line three times within a 3 second period has been found to be sufficiently distinct so as to make random noise spikes triggering data reporting an infrequent occurrence.

The circuitry used to generate the status data stream is illustrated in FIG. 8 at 600. The pulse generation circuitry 601 on command generates a series of pulses. The pulses generated are used to clock status data serially out of a shift register 605. The status data clocked out of the shift register 605 is coupled into the monitor status-pin 8 of the ARINC 722 connector 205 indicated at 687 in FIG. 8. The serial data thus provided at pin 8 of the ARINC 722 connector 205 can be read by circuitry, for example within a properly equipped tapping unit, such the circuitry illustrated in FIG. 5A and FIG. 5B.

The pulse generation circuitry 601 is commanded to generate the data clocking pulses by several different events. Powering on the display unit 101 will cause the pulse generation circuitry to generate the data clocking pulses, as will any failure within the display unit 105 which activates a BIT (built in test) status bit. Additionally, the pulse generation circuitry will furnish data clocking pulses upon request. The generation of the data clocking pulses will cause the serial status data to be sent.

In order to request data from the data generating and reporting unit 600 the line 610 is grounded 3 times within 3 seconds. One such grounding of the monitor on line 610 is shown at 689. The protocol implemented in the present embodiment to request data by using successive ground pulses applied to pin 610 within a period of three seconds may be replaced by other suitable timings and pulse counts as needed. The present protocol is chosen because it has been effective in preventing noise activation of the data reporting circuitry. It, however, is only one of many which may be effective, and it is not the intention to limit the invention to this protocol.

The first ground pulse on line 610 is coupled through diode 612 and appears on line 613 which is the input to a Schmidt type trigger circuit 615. The circuit 615 is utilized to insure that the grounding of the monitor on line generates an output with a sharp transition. The main function of the circuit 615 is to apply a hysteresis to the input signal to insure that multiple pulses are not generated by any contact bounce, which appears on line 610.

When the first pulse of a three-pulse request sequence is initiated, the start timing cycle signal 617 transitions from high to low. This high to low transition has two effects. The first effect is that it is used to generate the three second window in which three grounding pulses must be coupled to the monitor on input 610 in order to request data from the unit 600. The first negative going transition on the start timing/reset cycle line 617 is coupled into circuit 633. Circuit 633 is a circuit, which generates a three second positive going pulse upon being triggered by a high to low transition on its input 617. Such pulse generating circuits are well known in the art and may be accomplished by a variety of circuits such as non-retriggerable mono-stable multi-vibrators. A non-re-triggerable type multi-vibrator is chosen for circuit 633 because successive pulses will not trigger successive three-second windows until the first 3 second window has timed out. The three second positive going pulse which is output from the non-retriggerable mono-stable multi-vibrator 633 is coupled to line 629 and further provided to the reset line of flip-flops 637, 639 and 641. The reset circuits on flip-flops 637, 639 and 641 are active low so that a low level on line 629 will continually reset the flip-flops 637, 639 and 641. During a reset period the flip-flops 637, 639 and 641 will not change states. A change of state is only permitted in flip-flops 637, 639 and 641 when the reset input provided to each 629 is high. This high level window is provided for three seconds by the pulse 635 supplied by mono-stable multi-vibrator 633 as a result of the first positive to negative transition of the monitor on line 689.

Flip Flops 637, 639, and 641 are connected in series and so serve to count the 3 pulses during the 3 second window during which they are enabled. The first transition of the monitor on line 610 as shown in 689 starts the three-second timing of circuit 633 and also clocks flip-flop 637. The clocking of flip-flop 637 results in a low to high transition on the Q bar output 619 of flip-flop 637. The Q bar output 619 is further provided to the clock input of flip-flop 639. The second pulse of a three pulse data request circuit on pin 610 once again clocks flip-flop 637 and the line 619 which had transitioned to a high state now transitions from high to low thereby causing flip-flop 639's output line 621 to transition from low to high. The third pulse within three seconds when coupled to line 610 clocks flip-flop 637, which in turn clocks flip-flop 639 and in turn clocks flip-flop 641, which causes the Q bar output of flip-flop 641 to transition to a low state. The Q bar output of flip-flop 641 is provided to an AND gate 653. If either of the inputs to the AND gate 653 transition from high to low then the output 669 of the AND gate 653 transition from high to low. The high to low transition of flip-flop 641 coupled into AND gate 653 will then be provided to the 128 counter 670. The high to low transition on line 669, which is provided to the reset of 128 counter 670 will reset the counter 670 and allow it to count. The 128 counter 670 is provided with a clock input from line 649. Oscillator 611, in the illustrated embodiment, is a 1200 Hz oscillator (although other frequencies may be employed equally as well) which provides AND gate 651 with a pulse train input. (9600 Hz has been used in the preferred embodiment.)

The pulse generation circuitry 601 will also provide clocking pulses, to report data, as a consequence of the detection of a power on condition by power on detection circuit 666. When the video display unit 101 powers on, the power on detector 666 detects the occurrence of a power on condition and provides a low to high transition signal on output line 665. The power on signal on line 665 will remain high as long as power is present within the unit. The high level provided by the power on detector to AND gate 651 will make AND gate 651 transparent to any signals appearing on the other AND gate 651 input, thus enabling the oscillator output 40 to appear at the output of pulse generation circuitry 601. The output of the oscillator 611 will also be coupled transparently through AND gate 651 to the output of 128 counter 670. Once the 128 counter 670 has been reset the counter may count the oscillations on line 649. The counting will also be coupled to the count overflow output 631. The counter overflow output 631 is coupled into AND gate 645 and together with the output of 649 AND gate 651. Counter overflow output 631 remains at a high level until the counter overflows. The pulse train appearing on 649 will be coupled through AND gate 645 as long as the counter overflow 631 remains high. As long as the 128 counter 670 has no overflow (i.e., line 631 remains high) pulses will be coupled to the output of the counting circuit 601 and will be provided on line 603. Once the 128 counter 670 has reached a maximum count of 128 the counter overflow 631 will transition from high to low disabling AND gate 645. The counter overflow 631, by transitioning from high to low will disable counter 670 by coupling the counter overflow signal on line 631 through inverter 632 to the counter 670 disable input. The 128 counter 670 will remain disabled until the 128 counter 670 is reset, by a low signal provided on line 669. Although the illustration in FIG. 8 shows a counter 670 which is a 128 counter, which will provide 128 counts before overflowing, those skilled in the art will recognize that any number of pulses can be provided. In order to generate a larger number than 128 counts two 128 counters can be coupled together in serial. In order to generate a number of counts less than 128 the counter 670 can be preloaded with an initial count number. Commonly some binary counters have preload count inputs for preloading the counters with a desired value.

In the manner just described, when the monitor on-command 689 transitions from high to low three times within three seconds a 128 pulse pulse-train is generated at the output of the count circuit 601. The 128 pulse train at the output 603 of the count circuit 601 will cause the serial stream of unit 600 data to be coupled into pin 8 monitor status 687.

The generation of pulses by circuitry 601 may also be caused by the detection of a BIT fault from any of the bits in BIT word 623, 625, or 627 as explained more fully below. In this way a BIT fault will cause the serial status data to be sent.

The circuit 601 also has another trigger mechanism for causing the generation of a pulse train at the output 603 of the pulse generator circuit 601 (thereby superimposing data on pin 8, the monitor status pin 687 of the ARINC 722 connector and sending the serial status data). If the input 671 to AND gate 653 at any time transitions from high to low the output of AND gate 653 will transition to a low state. The transition of the output of AND gate 653 is coupled to line 669, the reset input of the 128 counter 670 thereby causing a count cycle to begin and a pulse train to be generated at the output 603 of the pulse generator circuit 601.

Input 671 to AND gate 653 can transition from high to low due to a variety of causes. The inputs to AND gate 659 are all generally high so that when any input to AND gate 659 transitions from high to low the output of AND gate 659, i.e., line 671, will transition from high to low. The transitioning of the output 671 of AND gate 659 from high to low will cause AND gate 653 to transition from high to low, thereby providing a reset signal on line 669 into the 128 counter reset 670 thereby triggering the serial status data to be sent.

Any input to AND gate 659, can trigger the sending of the serial status data, for example, input 667. Input 667 is coupled through a delay circuit 668 to a power on detector circuit 666. When the display unit 101 powers on, after a short delay to allow circuitry to stabilize, input 667 is pulsed low, as seen at 670, thereby triggering the serial status data to be sent.

The delay circuit 668 is inserted between the power on detector circuit and the AND gate 659 in order to allow the video display unit power supplies to stabilize and for the backlights, which provide back lighting for the LCD displays, to turn on and stabilize. In other words, it is desired that the video display unit report its status data at the beginning of a turn on cycle after the circuitry is allowed to stabilize, so there is less possibility of erroneous readings. The negative going pulse 670 appears after a predetermined time after the unit has come on. The negative going pulse 670 is provided to AND gate 659 via the input 667. The negative going transition on line 667 due to pulse 670 causes the output of gate 659 to transition from high to low. The high to low transition of the output 671 of the AND gate 659 is coupled into AND gate 653 and resets 128 counter 670 thereby triggering a data reporting pulse stream at the output 603 of pulse generating circuit 601.

A fault in any of the built in test (BIT) discrete bits will cause the serial status data to be sent. Accordingly, a fault on BIT word 1-623, BIT word 2-625, or BIT word 3 will cause the serial status data to be sent. Any negative going pulse on BIT word one 623, BIT word two 625 or BIT word three 627 will be coupled into the input of AND gate 659. A high to low transition on any of the BIT words will, in a manner similar to the high to low transition on 667, trigger a data reporting pulse stream. Inputs 623, 625 and 627 (BIT words 1, 2 and 3) are typically held high during normal operation. If any bit of a BIT (Built In Test) word transitions from high to low, the output of AND gate 659 will transition from high to low thereby generating a data reporting pulse stream from pin 8, the monitor status output of the video display unit.

The BIT (Built In Test) words 1, 2 and 3 are defined in the table illustrated in FIG. 7. The BIT discretes are active low so that a high to low transition in any of the bit of BIT word 1 623, BIT word 2 625, or BIT word 3 627 will signify a failure or abnormal condition within the unit. The transition of any BIT discrete from high to low will cause a status data stream to be sent. In addition, a transformation from a high to a low on BIT 1 623, BIT 2 625, BIT 3 627 or the power on circuitry will be coupled into AND gate 659 and in addition the current state of circuit parameters will also be read into shift register 605. The parameters, which will be read into shift register 605, are BIT word 1 623, BIT word 2 625, BIT word 3 627, the type of unit 677, the serial number of the unit 679, the version of the unit 681, the operating time of the unit 683 and the number of deployed stove cycles the unit has undergone 685. The output 671 of AND gate 659 transitioning from high to low will accomplish the reading of the status variables. The transitioning of line 671 from high to low is coupled into the read/write input of the shift register 689. When the read/write line 689 transitions from high to low, the shift register 605 loads the status values 677, 679, 681, 683, 685, 623, 625 and 627. The pulse train provided to the shift register clock input 685 on line 603 will clock the shift register 605. The clocking of the shift register 605 couples its output serially into field effect transistor (FET) 607 thereby superimposing the status data onto pin 8 of the monitor status line 687. BIT word 1 623, BIT word 2 625, and BIT word 3 627 are grouped according to their different functions. BIT word type 1 are all faults which are so serious that the unit will shut down. BIT word type 2 faults are faults which are reported, but the display unit 101 will continue to operate, and BIT word 3 is reserved for future use.

BIT word 1 faults represent a failure of the unit. BIT word 1 faults indicate the unit needs servicing before it can once again be used. Because the faults represented by BIT word 1 623 are serious faults that cause the unit to shut down, the conditions of the unit at the time of the occurrence of any BIT word type 1 fault are saved, in a flash memory 647, for later trouble shooting evaluation by a technician.

The serial flash memory 647 stores the status values that were present within the unit when a BIT word 1 failure occurs. These status variables are typically the same as those stored in shift register 605. Serial flash memory 647 will only be written to one time because it will be only written to when a BIT word 1 type fault occurs. The writing into the flash memory a single time disables any subsequent writing into the flash memory 647 until the system is repaired. Upon repair of the system a repair technician will reset the flash RAM.

When a type 1 BIT fault occurs the display unit shuts down and must be serviced. When a type 1 BIT fault occurs, the status values are coupled from the shift register 605 serially into the serial flash memory 647. When a display unit 101 has been repaired or is new, switch 661 is in a closed position thereby coupling the data reporting pulse stream 603 to the clock input 683 of the serial flash memory 647. The output of the shift register 605, in addition to being coupled into the monitor status 687 on pin 8 of the ARINC 722 connector, is also coupled into the data input 664 of the serial flash memory.

The serial status, however, is not written into the serial flash memory until the writing into the serial flash memory is enabled by a low to high transition on the read/write line 687a of the serial flash memory 647. For this purpose, BIT word 1 is coupled into AND gate 657. The output of AND gate 657 is coupled, along with an output of a D type flip-flop 655 into OR gate 658. D type flip-flop 697 is a nonvolatile type memory unit, which will maintain its value even when it is disconnected from a power source. The nonvolatile D flip-flop 697 is reset to a zero value via line 683. The output of the D flip-flop is provided to OR gate 658. As long as OR gate 658 has one input from the D flip-flop that is in a zero value condition, the output of the OR gate 658 will follow the other input transparently. If however OR gate 658 has one input which is a "1" the output of the OR gate 658 will remain at a "1" value regardless of the other input. Once the output of OR gate 658 transitions from a high to a low, the "D" flip-flop 697 is clocked. When the "D" flip-flop 697 is clocked, output of the D flip-flop 697 changes from a zero to a one, thereby causing line 699 to remain in a high state until the flip-flop 697 is reset. A repair technician will typically reset flip-flop 697.

So as long as all the BIT word 1 values are high, the output of AND gate 657 will be high. Once a value of one of the bits of BIT word 1 623 transition from high to low, then the output of AND gate 657 will transition from high to low. The output of the OR gate 658 is coupled via 699 into the read/write input 687a of the flash memory 647. When the output of OR gate 658 transitions from high to low, the serial flash can be written into. Once, however, the output of OR gate 658 transitions from high to low one time, the D type flip-flop will be clocked and will couple a one value into its output and thereby disabling OR gate 658 by coupling a 1 value into one its inputs. This mechanism allows the serial flash memory to be written into only one time upon the first occurrence of a BIT type 1 failure. This first occurrence of a BIT type 1 failure condition will be logged in the serial flash memory even though other BIT type 1 failures may occur. When the video display unit 101 is taken in for service, the status of the unit at the time the first BIT type 1 failure occurred will be contained in the serial flash memory.

To retrieve data stored in the serial flash memory 647 a technician can take the unit and open switch number 661, place a clock signal on clock input 663 of the serial flash memory and by observing the output 661a of the serial flash memory 647, observe the status values of the unit at the time that the BIT type 1 failure occurred. Once the technician has repaired the unit, the switch 661 can be restored to the on position thereby coupling the pulse output from unit 601 on line 603 as the clock input to the serial flash memory 647. Upon repair of the video display unit, technician will also reset the nonvolatile type D flip-flop 697 to provide a 0 input to OR gate 658 so that once again the first word 1 type BIT failure can be coupled into the serial flash memory. In this way, data upon the occurrence of a serious BIT type 1 failure can be saved in a flash for further trouble shooting.

Those skilled in the art will recognize that the preceding description of the circuitry of the system for data reporting is merely exemplary. Many other variations of circuitry can be used within the context of the teachings of this disclosure in order to accomplish the data reporting system disclosed. Those skilled in the art will also recognize that many of the values within the circuitry are merely exemplary. For example, the 1200 hz oscillator 611 is chosen as merely a convenient value, for exemplary purposes. Other values, such as 9600 can be chosen for the oscillator 611 depending on the implementation desired. Those skilled in the art will also recognize that the number of bits of status is also only exemplary. The number of status bits will depend upon the implementation and the type of information that to be saved. The teachings of this disclosure can be used to implement data reporting of larger amounts or greater amounts of data at will. Additionally the protocol for reporting data, illustrating in this embodiment as three negative pulses coupled to the monitor on input within three seconds, can be changed at will. The type of signaling on the monitor on line in order to cause a data reporting by the unit can be changed to any other appropriate protocol. The present implementation is provided as an illustration of the inventive concepts herein and is in no way meant to limit the teachings herein. Those skilled in the art can conceive of multiple ways of accomplishing the same type of data signaling and data reporting in light of the teachings within this disclosure. In addition, BIT word 3 has been provided an illustration of expandability of the capabilities of the units described. Those skilled in the art will also recognize that the discrete circuitry described herein is also for the purpose of illustration only. All the functions herein may be easily accomplished by a programmable circuit, such as a micro processor, programmable logic array or micro computer system.: The inventive concepts disclosed here are not dependent upon the implementation details, frequencies, protocols or amount of data reported.

The serial status data stream illustrated in the preferred embodiment is formatted using 1 start bit, 8 data bits, 1 odd parity bit, 1 stop bit and the idle state between words which is greater than or equal to one byte. The start bit is implemented as a negative signal, i.e., logic 0, and the stop bit is logic 1. The idle state is defined as logic 1 equivalent to 28-volts DC nominal. Data may be sent at 9600 baud as is done in the ARINC 485 specification or at some other frequency. Other formats for the serial status data stream may be equivalently applied with no loss in functionality. No handshaking with the tapping unit, e.g., request to send signal, is provided.

The present arrangement of data has been chosen for a reason. The order of the data is designed to allow the tapping unit to miss the beginning or end of the data transmission without serious consequences. At the initiation of the tapping unit may not be "listening" and may be occupied with other functions. At the end of the status data transmission there may not be enough power within the unit to complete the transmission of all the data, particularly if there has been a unit power supply failure. For this reason, the BIT discrete data are located in the middle of the transmission. The BIT information is the most critical information because it contains the actual operating status of the unit. Therefore if a display unit 101 should fail and send out a bitstream and the tapping unit is involved in some other task and misses the first few BITS of the transmission it may nevertheless receive the BIT discrete data. Also, if the unit fails and has only limited power the unit may not be able to complete its transmission. The BIT discrete data, which is sent prior to the end of the transmission, is thereby protected.

The BIT discretes represent operating status information for the display unit 101. The BIT discretes are formatted such that logic 0 indicates fault, and a Logic 1 indicates normal operation thereby reducing the risk of the tapping unit falsely interpreting noise as faults. Certain BIT discrete faults will cause the unit to send a BIT report and then shut the unit down.

The foregoing descriptions of embodiments of the present invention are described for the purpose as illustration an description of aspects of the invention. It is not intended to limit the invention to the implementation described. The embodiments described are not exhaustive in providing a description of the possible variations of the invention and variations, modifications, and implementations are possible in light of the preceding teachings.

What is claimed is:

1. A system for gathering data from a commercial airline display unit, the system comprising:
    an electronic unit for requesting and receiving said data, said electronic unit requesting said data by providing a first signal to the commercial airline display unit a predetermined number of times within a predetermined time interval;
    said airline display unit receiving said first signal and providing superimposed said data upon a static status signal, said superimposed data being provided to said electronic unit; and
    a receiver within the electronic unit receiving and decoding the superimposed data.

2. A system as recited in claim 1, wherein the electronic unit comprises a commercial aircraft tapping unit.

3. A system as recited in claim 1 wherein the static status signal comprises the "on indicator" on pin 8 of an ARINC 722 connector.

4. A system as recited in claim 1 wherein the first signal is the power control on signal.

5. A system as recited in claim 1 wherein the first signal is provided to pin 6, the power control on input, of an ARINC 722 connector on said commercial airline display unit.

6. A system as recited in claim 1 wherein the display is part of an in-flight entertainment system.

7. A system as recited in claim 1 wherein said airline display unit further comprises:
    an ARINC connector,
    a power on detection circuit coupled to receive a power-on signal along pin 6 of said ARINC connector and providing an output signal in response to detection of said power-on signal;
    a delay circuit connected to an output of said detection circuit and responsive to said power-on signal to generate a delayed signal; and
    said airline display unit responsive to said delay signal for transmitting a plurality of additional status signals.

8. A system as recited in claim 7 wherein said airline display unit responds to a predetermined sequence of additional signals along pin 6 of said ARINC connector to transmit current values of said plurality of additional status signals.

9. A system as recited in claim 7 wherein said airline display unit further comprises a memory device for storing said plurality of additional status signals upon the occurrence of said built-in-test signal indicating a failure of said display unit.

10. A system for gathering data from a commercial airline display unit, the system comprising:
    electronic unit means for requesting and receiving said data, said electronic unit requesting said data by providing a first signal to the commercial airline display unit;
    said airline display unit receiving said first signal and providing said data as superimposed data in the form of a serial or modulated data stream upon a static status signal, said superimposed data being provided to said electronic unit; and
    receiver means within the electric unit for receiving and decoding the superimposeed data.

11. A system as recited in claim 10 wherein the electronic unit means comprises a commercial aircraft tapping unit.

12. A system as recited in claim 11 wherein the static status signal comprises the "on indicator" on pin 8 of an ARINC 722 connector.

13. A system as recited in claim 12 wherein the first signal is the power control on signal.

14. A system as recited in claim 10 wherein the first signal is coupled to pin 6, of an ARINC 722 connector on said commercial airline display unit.

15. A system as recited in claim 10 wherein said airline display unit further comprises:
    an ARINC connector;
    a power on detection means for receiving a power-on signal along pin 6 of said ARINC connector and providing an output signal in response to detection of said power-on signal;

a delay circuit means for responding to said output signal to generate a delayed signal; and said airline display unit responsive to said delay signal for transmitting a plurality of additional stats signals, wherein the additional status signals are provided as superimposed data.

16. A system as recited in claim 15 wherein said airline display unit responds to a predetermined sequence of additional signals along pin 6 of said ARINC connector to transmit current values of said plurality of addition status signals.

17. A system as recited in claim 16 wherein said airline display unit further comprises a memory means for storing said plurality of additional status signals upon the occurrence of said built-in-test signal indicating a failure of said display unit.

18. A method of gathering data from a commercial airline display unit, the method comprising:

requesting said data with an electronic unit from a commercial airline display unit, said electronic unit requesting said data by providing a first signal to the commercial airline display unit;

providing superimposed data in the form of a serial or modulated data stream upon a static status signal said superimpose data being provided to said electronic unit; and receiving and decoding the superimposed data.

19. A system as recited in claim 18 wherein the static status signal comprises the "on indicator" on pin 8 of an ARINC 722 connector.

20. A system as recited in claim 19 wherein the first signal is the power control on signal.

\* \* \* \* \*